No. 842,394. PATENTED JAN. 29, 1907.
H. M. FISK.
TRAVELING CAPSTAN.
APPLICATION FILED JULY 18, 1906.
2 SHEETS—SHEET 2.
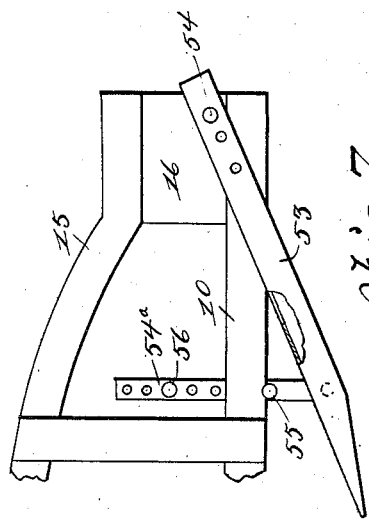
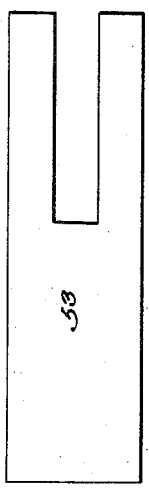
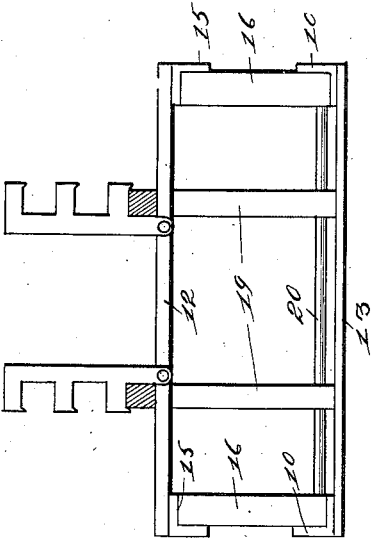
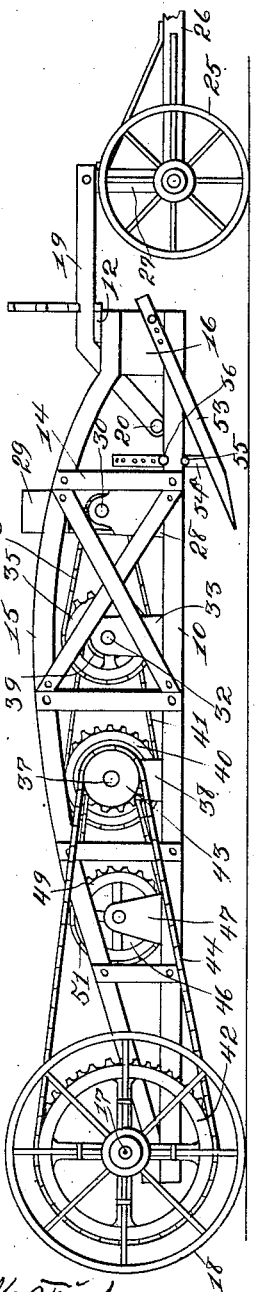
Witnesses:
R. H. Orwig.
H. H. Labrock
Inventor: Henry M. Fisk,
By Thomas G. Orwig, Attorney.

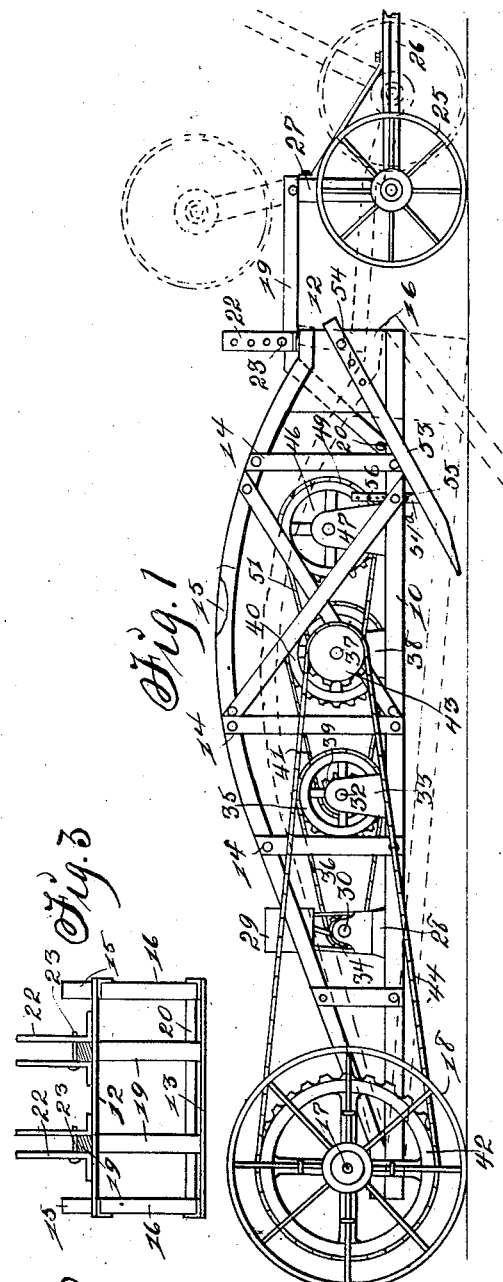

UNITED STATES PATENT OFFICE.

HENRY M. FISK, OF PELLA, IOWA.

TRAVELING CAPSTAN.

No. 842,394.  Specification of Letters Patent.  Patented Jan. 29, 1907.

Application filed July 18, 1906. Serial No. 326,788.

*To all whom it may concern:*

Be it known that I, HENRY M. FISK, a citizen of the United States, residing at Pella, in the county of Marion and State of Iowa, have invented a new and useful Traveling Capstan, of which the following is a specification.

My object is, first, to provide a strong, durable, adjustable, and efficient traveling capstan; second, to utilize a motor on the capstan for rotating a drum as required for applying power to a ditching-machine; third, to utilize the motor on the capstan for moving the capstan forward; fourth, to detachably fix the machine to the ground preparatory to operating a ditcher therewith; fifth, to pivotally connect the front carriage with the capstan-frame so that it can be elevated for lowering the capstan to the ground preparatory to operating the machine.

My invention consists in the construction, arrangement, and combination of elements and subcombinations, as hereinafter set forth, pointed out in my claims, and illustrated in the accompanying drawings, in which—

Figure 1 is a side elevation of the machine and dotted lines indicate how the front carriage can be elevated and the front end of the machine lowered and fixed to the ground by means of adjustable anchors. Fig. 2 is a top view of the machine that shows the positions of all the parts relative to each other and the frame upon which they are mounted. Fig. 3 is a transverse sectional view on the line $x\ x$ of Fig. 2 and shows how the pivoted hounds of the front carriage are adjustably fastened on the front end of the machine-frame. Fig. 4 is a modification of Fig. 1. Fig. 5 shows one of the anchors. Fig. 6 is a modification of Fig. 3. Fig. 7 shows the form of anchors adapted to be adjustably connected with the machine.

The numeral 10 designates the mating sides of the machine-frame. They are preferably angle-iron and about fourteen feet long and rigidly connected at their rear ends by cross-pieces 12 and 13. Uprights 14 are fixed to the sides 10 and arched top pieces 15 of the frame are fixed to the uprights 14, to the rear ends of the sides 10, and to blocks 16, fixed on top of the front ends of the sides 10.

An axle 17, supported upon wheels 18, is mounted on the rear end of the frame. Elbow-shaped hounds 19 are connected at their rear ends by a bar 20 in such a manner that the ends of the bar will rest upon the sides 10 and their front end portions will rest upon a cross-bar 12, fixed to the front ends of the top pieces 15 of the frame.

Elbow-shaped irons 22 are fixed on top of the cross-bar 21 and provided with bolt-holes that allow bolts 23 to be inserted for detachably fastening the hounds on top of the cross-bar 21 as required for applying horse-power to the hounds and front carriage for moving the machine.

A front carriage, consisting of an axle 24, wheels 25, a pole 26, and an upright or bolster 27, is pivotally connected with the front ends of the hounds 19 in such a manner that the front carriage can be turned up as required to facilitate lowering the front end of the machine-frame, as indicated by dotted lines in Fig. 1.

To the sides 10 at their rear end portions are fixed cross-pieces $27^a$, and on the cross-pieces is a platform 28, upon which is located a gas-engine 29 or other suitable motor for operating a driving-shaft 30, mounted in a suitable bearing 31, fixed on the cross-pieces $27^a$.

A shaft 32 is mounted on bearers 33, fixed to the sides 10, and connected with the driving-shaft 30 by a sprocket-wheel 34 on the driving-shaft, a sprocket-wheel 35 on the shaft 32, and a chain 36 on the said wheels. A third shaft 37 is mounted in bearings 38 and connected with the shaft 32 by a sprocket-wheel 39 on the shaft 32, a sprocket-wheel 40 on the shaft 37, and a chain 41 on the said wheels.

The shaft 37 is connected with the wheels 18 by sprocket-wheels 42, fixed to said wheels, sprocket-wheels 43 on the ends of the shaft 37, and chains 44 on said wheels, as shown in Fig. 2, and as required for transferring power and motion from the motor 29 to the wheels 18 for advancing the machine when it is not anchored to the ground.

Clutch members 45 on the ends of the shaft 37 must be engaged when the machine is to be moved forward.

To apply power from the motor 29 to a ditching-machine, a drum 46 is mounted on bearers 47, fixed to the sides 10 of the frame, and a rope 48 fixed thereto to be wound thereon and extended rearward to be connected with a ditching-machine. Sprocket-wheels 49 on the ends of the drum are connected with sprocket-wheels 50 on the shaft 37 by chains 51 in such a manner that when clutch member 52 on the shaft 37 are engaged and the clutch members 45 on the end of the same shaft not engaged the power of the motor will be transferred to the drum and from the drum to the ditcher.

Anchor devices 53 in the shape of flat-pointed shovels bifurcated at their upper ends and placed astride the front end portions of the sides 10 and blocks 16 of the frame to incline rearward, and their bifurcated top ends and the blocks are provided with coinciding bolt-holes to be adjustably connected with the frame by bolts 54 passed through the bolt-holes.

In the practical use of my invention the anchor devices 53 can be readily adjusted to enter the ground to different depths as required for making ditches of different depths by adjusting the devices and also inverting the front carriage and lowering the front end of the machine-frame, as indicated by dotted lines in Fig. 1. By then applying power to a ditcher my machine will be drawn rearward, and the anchor devices 53 will penetrate the ground, arrest rearward motion, and the power will then be applied to the ditcher to advance and operate it as required to produce an open ditch, and when the ditcher reaches my machine the power of the motor can be released from the ditcher by disengaging the clutch.

Braces 54ª in the form of blades adapted to cut the ground are pivotally connected with the anchor 53 and provided with pin-holes, that allow a pin 55 to be inserted below the sides 10, and a pin 56 in their upper end portions in such a manner that the lower pin 55 will arrest the downward motion of the capstan and cause the weight of the capstan to be applied to the anchors 54, as required, to force the anchors into the ground as the machine is moved rearward, and the upper pin 56 retains the anchors inclined, as desired.

To withdraw the anchors 54 from the ground by a forward motion of the capstan by power applied to the machine, the upper bolt 56 is withdrawn and the front end of the frame will rise and the anchors 54 will slip out of the ground without lifting the ground, as occurred heretofore.

Fig. 4 shows the positions of the motor and the drum and gearing in reversed position relative to the frame upon which they are mounted.

It is obvious the capstan can thus be readily utilized by means of the motor mounted thereon for actuating a ditcher and also readily moved forward at intervals without horses, and whenever desired horses can be hitched thereto for moving it from place to place over roads and fields without using the motor carried on the capstan.

Having thus set forth the purposes of my invention, its construction, and manner of use, the practical operation and utility thereof will be obvious.

What I claim as new, and desire to secure by Letters Patent, is—

1. In a traveling capstan, a frame mounted at its rear end upon an axle and wheels, means for supporting and raising and lowering the front end of the frame, adjustable anchors on the front end of the frame, a motor on the end portion of the frame, a driving-shaft connected with the motor and gearing for transferring power to the wheels for advancing the frame.

2. In a traveling capstan, a frame mounted at its rear end upon an axle and wheels, means for supporting and raising and lowering the front end of the frame, a motor on the end portion of the frame, a driving-shaft connected with the motor and gearing for transferring power to the wheels for advancing the frame, a drum on the end portion of the frame and gearing to transfer power from the motor to the drum.

3. In a traveling capstan, a frame mounted at its end upon an axle and wheels, means for supporting and raising and lowering the front end of the frame, a motor on the end portion of the frame, a driving-shaft connected with the motor and gearing for transferring power to the wheels for advancing the frame, a drum on the end portion of the frame and gearing to transfer power from the motor to the drum and a rope fixed to the drum for connecting a ditching-machine with the drum and motor.

4. In a traveling capstan, a frame mounted at its rear end upon an axle and wheels, means for supporting and raising and lowering the front end of the frame, a motor on the end portion of the frame, a driving-shaft connected with the motor and gearing for transferring power to the wheels for advancing the frame, a drum on the end portion of the frame and gearing to transfer power from the motor to the drum and a rope fixed to the drum for connecting a ditching-machine with the drum and motor and means for raising and lowering the front end of the frame.

5. In a traveling capstan, a frame mounted at its rear end upon an axle and wheels, means for supporting and raising and lowering the front end of the frame, a motor on the end portion of the frame, a driving-shaft connected with the motor and gearing for transferring power to the wheels for advancing the frame, a drum on the end portion of the frame and gearing to transfer power from the motor to the drum and a rope fixed to the drum for connecting a ditching-machine with the drum and motor and means for raising and lowering the front end of the frame and means to fasten the front end of the frame to the ground to prevent backward movement of the capstan.

6. In a traveling capstan, a frame supported upon wheels at its rear end, flat blades bifurcated at their top ends and means for adjustably connecting them astride the sides of the frame.

7. In a traveling capstan, a frame supported upon wheels at its rear end, adjustable anchors on the front end of the frame elbow-shaped hounds adjustably connected with the front end of the frame and a front carriage pivotally connected with the front ends of the hounds.

8. A traveling capstan comprising a frame supported at its rear end upon wheels, an adjustable front carriage at its front end, a motor on the frame, a driving-shaft connected with the motor and frame, gearing for transferring power from the motor to the rear supporting-wheels, gearing for transferring power from the motor to a drum, a drum on the frame, a rope on the drum, and adjustable anchoring devices connected with the front end portion of the frame, arranged and combined to operate as set forth.

9. In a traveling capstan, a frame supported upon wheels at its rear, anchors adjustably connected with the front end of the frame to incline rearward and downward, blades for cutting ground and adjusting the anchor provided with pin-holes and pivotally connected with the anchor, and pins in the blades to engage the frame as set forth.

10. In a traveling capstan, a frame supported upon wheels at its rear end, anchors pivotally connected with the front end of the frame to incline rearward and downward, braces pivotally connected with the anchors and provided with pin-holes and pins in the pin-holes, to operate as set forth.

HENRY M. FISK.

Witnesses:
R. H. ORWIG,
THOMAS G. ORWIG.